(12) United States Patent
Hamada

(10) Patent No.: US 7,891,854 B2
(45) Date of Patent: Feb. 22, 2011

(54) BACKLIGHT DEVICE AND DISPLAY DEVICE USING THE SAME

(75) Inventor: Tetsuya Hamada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 297 days.

(21) Appl. No.: 12/294,073

(22) PCT Filed: Nov. 30, 2006

(86) PCT No.: PCT/JP2006/323961

§ 371 (c)(1), (2), (4) Date: Sep. 23, 2008

(87) PCT Pub. No.: WO2007/138725

PCT Pub. Date: Dec. 6, 2007

(65) Prior Publication Data

US 2009/0147534 A1 Jun. 11, 2009

(30) Foreign Application Priority Data

May 26, 2006 (JP) .............................. 2006-146950

(51) Int. Cl.
*F21V 7/04* (2006.01)

(52) U.S. Cl. .................... 362/612; 362/27; 362/231; 362/613; 362/800; 349/61; 349/65; 345/102

(58) Field of Classification Search ............. 362/26–27, 362/227, 231, 561, 611–613, 800; 349/61, 349/65; 345/102
See application file for complete search history.

(56) References Cited

U.S. PATENT DOCUMENTS

2006/0087487 A1   4/2006   Ota
2006/0205242 A1*  9/2006   Noh et al. ..................... 439/57

FOREIGN PATENT DOCUMENTS

| JP | 09-330611 A   | 12/1997 |
| JP | 2001-222242 A | 8/2001  |
| JP | 2004-021147 A | 1/2004  |

OTHER PUBLICATIONS

Official Communication issued in International Patent Application No. PCT/JP2006/323961, mailed on Jan. 16, 2007.

* cited by examiner

*Primary Examiner*—Sandra L O Shea
*Assistant Examiner*—Meghan K Dunwiddie
(74) *Attorney, Agent, or Firm*—Keating & Bennett, LLP

(57) ABSTRACT

In a backlight device, among a plurality of light emitting diodes, light amounts thereof are measured in advance, and they are classified as any one of two or more light amount ranks according to the measurement results. In each of an upper region and a lower region of the light emitting diodes that are set on an upper side and lower side of a light guide plate, respectively, the light emitting diodes that are classified as having the same light amount rank are disposed.

9 Claims, 4 Drawing Sheets

BACKLIGHT DEVICE AND DISPLAY DEVICE USING THE SAME

BACKGROUND OF THE INVENTION

1. Field of the Invention

The present invention relates to a backlight device, in particular, a backlight device having a light emitting diode as a light source, and a display device using the same.

2. Description of the Related Art

Recently, for example, a liquid crystal display has been used as a flat panel display having features of a thinner body, a lighter weight and the like, as compared to those of a conventional Braun tube, and widely applied for use in a liquid crystal television set, a monitor, a mobile phone and the like. Such a liquid crystal display includes a backlight device for emitting light, and a liquid crystal panel for displaying a desired image by functioning as a shutter for light from a light source that is mounted to the backlight device.

Moreover, for the backlight device, a liquid crystal display of an edge-light type or a direct light type, in which a linear light source constituted of a cold cathode ray tube or a hot cathode ray tube is disposed on a lateral side or a lower side of the liquid crystal panel, is provided. However, the above-described cold cathode ray tube or the like includes mercury, and thus is difficult to be recycled or the like when it is disposed. Then, a backlight device that uses a light emitting diode (LED) with no mercury included as the light source has been suggested (see, for example, JP 2004-21147 A).

Further, the above-described conventional backlight device is provided with light emitting diodes that emit light in three colors of red (R), green (G) and blue (B), respectively, and the colored light in these three colors is mixed so as to obtain white light. Moreover, this conventional backlight device is provided with a sensor for detecting the light from the light emitting diodes, and adjusts light amounts of the respective light emitting diodes of R, G, B based on the detection results, and thereby to change of brightness and color degrees of the corresponding light emitting diodes over the course of time can be suppressed.

By the way, the light amounts of the light emitting diodes as described above are varied significantly. That is, even products of the light emitting diodes with the same design values of various characteristics, such as model numbers, model types, light degrees, rated current values and directivities, may be significantly different in light amount from one another, depending on quality, properties and the like of their semiconductor materials. Moreover, a lighting efficiency of the light emitting diode is easily changed according to a change of environment of use, in particular, a change of its surrounding temperature, compared with a lighting efficiency of a cathode ray tube or the like, and the light amount thereof is also changeable comparatively.

Thus, as described above, the conventional backlight device that is provided with a plurality of the light emitting diodes had a problem in that the light amounts of the plurality of the respective light emitting diodes become non-uniform due to the change of the light emitting efficiencies resulting from the variation of the light amounts of the respective light emitting diodes and the change of the surrounding environment, and unevenness of the brightness of light toward a liquid crystal panel (on the outside) was likely to occur. In particular, when the number of the light emitting diodes to be provided is increased according to an increase of a screen size, brightness or the like of the liquid crystal display, a width of the non-uniformity of the light amounts (a difference between the light amounts of the brightest light emitting diode and the darkest light emitting diode) may be significantly large due to the increase of the number of the light emitting diodes provided, an increase of a heat amount caused thereby and the like. As a result, it became significantly difficult for the conventional backlight device to prevent the occurrence of the brightness unevenness of the light that is directed toward the outside, when increasing the number of the light emitting diodes provided.

Moreover, light emitting diodes with equivalent light amounts are not generally sold, and there may be a new problem in that, in the case of purchasing them while designating their light amounts, brightness and the like, it cannot be avoided that a unit price of the light emitting diode is jumped up and a cost for manufacturing the backlight device is increased.

SUMMARY OF THE INVENTION

In the light of the above-described problems, preferred embodiments of the present invention provides a backlight device that can prevent the occurrence of brightness unevenness even when increasing the number of light emitting diodes to be provided, and a display device using the same.

A backlight device according to a preferred embodiment of the present invention is a backlight device including a plurality of light emitting diodes, wherein each of light amounts of the plurality of the light emitting diodes is measured in advance, each of the plurality of the light emitting diodes is classified as any one of two or more light amount ranks according to the measurement results, and each of the light emitting diodes is disposed in any one of a plurality of disposition regions that are set in different locations such that the light emitting diodes which are classified as the same light amount rank are disposed in the same disposition region.

The plurality of the respective light emitting diodes in the backlight device structured as described above are classified into any one of the two or more light amount ranks based on the measurement results of their light amounts. Moreover, in the backlight device, the plurality of the disposition regions that are set in the different locations are provided, the light emitting diodes that are classified as the same light amount rank are disposed in any one of the plurality of the disposition regions. Thereby, even when a using environment is changed such as a surrounding temperature is changed in each disposition region, it is possible to prevent occurrence of brightness unevenness caused by variation of the light amounts of the respective light emitting diodes. As described above, since the occurrence of the brightness unevenness in each disposition region can be prevented, the occurrence of overall brightness unevenness of light that is emitted from the backlight device toward the outside can be prevented even in the case of increasing the number of the light emitting diodes to be disposed, unlike the above-described conventional example.

Moreover, in the backlight device, it is preferable that a driving circuit for driving to light the light emitting diodes is provided, and the plurality of the disposition regions are set in the different locations by using temperature distributions that are obtained when the light emitting diodes are driven to be lighted by the driving circuit.

In this case, in each disposition region, the light emitting diodes at the appropriate light amount rank are disposed in the state where their temperature distributions are recognized, so that the occurrence of the brightness unevenness in each disposition region can be prevented easily. Thereby, even in the case where the temperature distributions are different in the respective disposition regions, the occurrence of the overall brightness unevenness of the light to be emitted toward the outside can be prevented reliably.

Moreover, in the backlight device, the plurality of the disposition regions may also be set in the different locations by using the temperature distributions including a temperature increase due to heat generated by an external apparatus.

In this case, it is possible to avoid negative influence of the change of the surrounding temperature, which is caused by heat generated from the external apparatus, and prevent the occurrence of the brightness unevenness in each of the disposition regions more easily, thereby preventing the occurrence of the overall brightness unevenness of the light to be emitted toward the outside more reliably.

Moreover, in the backlight device, the plurality of the light emitting diodes may also include plural kinds of light emitting diodes that are different in emission color.

In this case, it is possible to increase a color purity of the above-described corresponding emission color, compared with the case of using white light emitting diodes for emitting white light, thereby structuring the backlight device with excellent emission quality.

Moreover, in the backlight device, it is preferable that the plurality of the light emitting diodes include red, green and blue light emitting diodes that emit red light, green light and blue light, respectively.

In this case, it is possible to increase each of color purities of the emission colors of red, green and blue, thereby structuring the backlight device with the further superior emission quality easily.

Moreover, in the backlight device, among the plurality of the light emitting diodes, light amounts of red and green light emitting diodes that emit red light and green light, respectively, may also be measured in advance, and the respective red and green light emitting diodes are classified as any one of two or more light amount ranks according to the measurement results.

In this case, the respective red and green light emitting diodes, which are easily varied in emission efficiency and light amount according to the change of the surrounding temperature, are classified into the light amount ranks, and it becomes possible to easily provide the respective red and green light emitting diodes at the light amount ranks that are most appropriate to any one of the disposition regions, thereby preventing the occurrence of the above-described brightness unevenness reliably and easily.

Moreover, in the backlight device, among the plurality of the light emitting diodes, light amounts of red light emitting diodes that emit red light are measured in advance, and the red light emitting diodes may also be classified as any one of two or more light amount ranks according to the measurement results.

In this case, the light amount ranks of the red light emitting diodes, whose emission efficiencies and light amounts are most likely to be changed according to the change of the surrounding temperature, are classified according to the light amount, so that it becomes possible to easily dispose the red light emitting diodes at the light amount rank that is most appropriate for any one of the above-described disposition regions, thereby preventing the above-described occurrence of the brightness unevenness more reliably and easily.

Moreover, the display device according to a preferred embodiment of the present invention is provided with a display portion, and the display portion is irradiated with light from either of the above-described backlight devices.

In the display device structured as described above, since the display portion is irradiated with the light from the backlight device that can prevent the occurrence of the brightness unevenness even when increasing the number of the light emitting diodes to be disposed, it is possible to easily structure the display device with excellent displaying function even when increasing the brightness and screen size of the display portion.

According to a preferred embodiment of the present invention, it is possible to provide a backlight device that can prevent occurrence of brightness unevenness even when increasing the number of the light emitting diodes to be disposed, and a display device using the same.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

A backlight device according to preferred embodiments of the present invention and a preferred embodiment of a display device using the same will be described below with reference to the drawings. Incidentally, in the below description, a case of applying a preferred embodiment of the present invention to a transmission type liquid crystal display is exemplified for the purpose of explanation.

Preferred Embodiment 1

Figure 1:
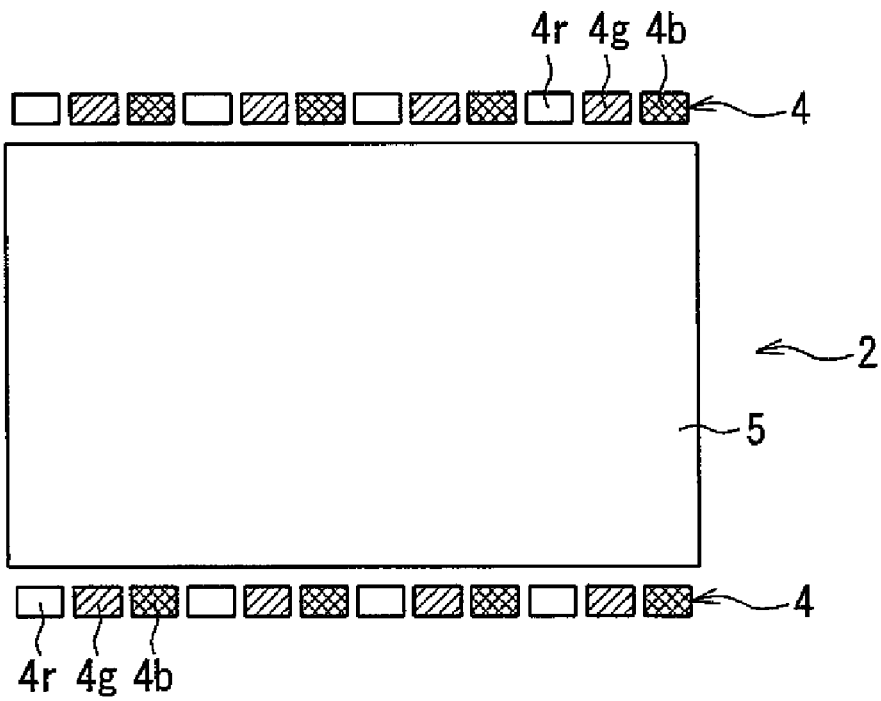
FIG. 1 is a plan view showing a structure of a relevant portions of a backlight device according to Preferred Embodiment 1 of the present invention.
Figure 2:
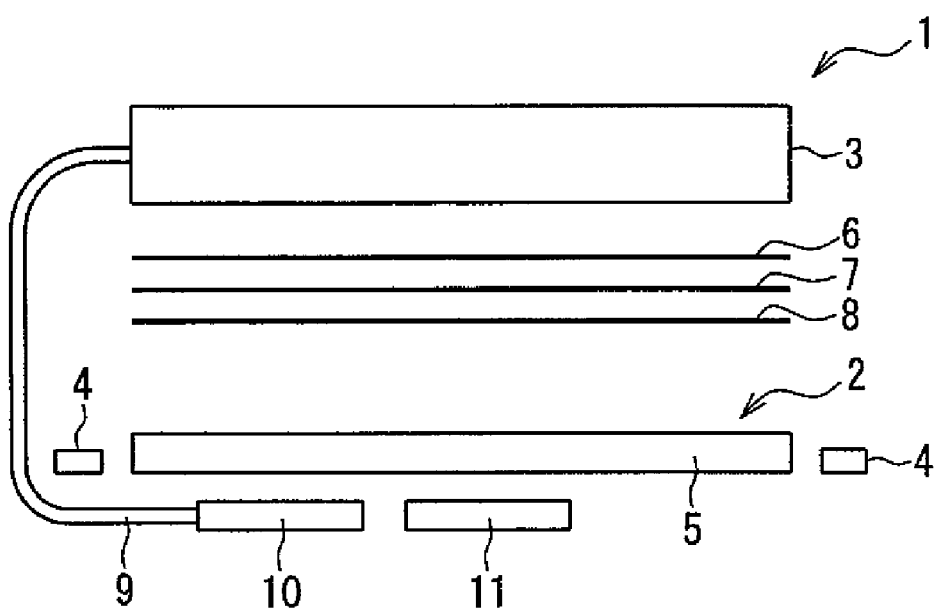
FIG. 2 is a view for explaining a liquid crystal display that is provided with the backlight device shown in FIG. 1.

FIG. 1 is a plan view showing a structure of a relevant portion of a backlight device according to Preferred Embodiment 1 of the present invention, and FIG. 2 is a view for explaining a liquid crystal display that is provided with the backlight device shown in FIG. 1. In FIGS. 1 and 2, in the present preferred embodiment, the backlight device 2 of the present invention and a liquid crystal panel 3 as a display portion that is irradiated with light from the backlight device 2 are provided, and the backlight device 2 and the liquid crystal panel 3 are unified as a transmission type liquid crystal display 1.

The backlight device 2 is provided with a plurality of light emitting diodes 4 as a light source and a light guide plate 5 into which the light from the plurality of the respective light emitting diodes 4 is introduced, and is irradiated with irradiation light in a flat shape from the light guide plate 5 to the liquid crystal panel 3 side. Moreover, in the backlight device 2, as illustrated in FIG. 1, the plurality of the light emitting diodes 4 are provided in a disposition region of the light emitting diodes 4 in any one of an upper region and a lower region that are set respectively on an upper side and on a lower side of FIG. 1 with respect to the light guide plate 5. The upper region and the lower region are incorporated into the liquid crystal display 1 so as to respectively face an upper portion and a lower portion in a horizontal direction of a display surface (not illustrated) that is provided with the liquid crystal panel 3. Moreover, during the use of the liquid crystal display 1, the upper region and the lower region are disposed respectively on the upper side and on the lower side in the vertical direction in which the gravity effects, and temperature distributions (temperature increasing ranges) during the use of the liquid crystal display 1 are different from each other (detail will be described later).

Moreover, the plurality of the light emitting diodes 4 include a red light emitting diode 4r, a green light emitting diode 4g and a blue light emitting diode 4b (illustrated without being hatched, hatched and cross-hatched, respectively) that emit red (R) light, green (G) light and blue (B) light, respectively. Further, the plurality of the respective light emitting diodes 4 are classified in advance as any one of two light amount ranks of a high light amount rank and a low light amount rank, as described below. The light emitting diodes 4 at the high light amount rank and the low light amount rank are disposed respectively in the upper region and the lower region described above.

Moreover, in the liquid crystal display 1, for example, a polarizing sheet 6, a prism (light gathering) sheet 7 and a diffusing sheet 8 are disposed between the liquid crystal panel 3 and the light guide plate 5, and the brightness of the illumination light from the backlight device 2 is increased appropriately by these optical sheets, thereby improving the displaying function of the liquid crystal panel 3.

Moreover, in the liquid crystal display 1, a liquid crystal layer (not illustrated) included in the liquid crystal panel 3 is connected with a driving control circuit 10 via an FPC (Flexible Printed Circuit) 9, and the driving control circuit 10 is structured so as to be able to drive the liquid crystal layer per pixel unit. Further, the driving control circuit 10 is provided with a calculating portion such as a CPU, and is included in an external apparatus of the backlight device 2 that functions as a heat source. Moreover, as shown in FIG. 2, the driving control circuit 10 is attached onto a back side of the light guide plate 5 of the backlight device 2, for example, near the above-described upper region. That is, the driving control circuit 10 is disposed on the light guide plate 5 on a non-display surface side of the liquid crystal panel 3 and on the upper side in the vertical direction along a horizontal direction of the display surface.

Moreover, in the vicinity of the driving control circuit 10, a light driving circuit 11 as a driving circuit for driving to light the plurality of the light emitting diodes 4 is disposed on a rear side of the light guide plate 5, for example, at a middle position between the upper side and the lower side in the vertical direction. This light driving circuit 11 includes a power supply circuit that constitutes a power supply for the respective light emitting diodes 4, a controlling (IC) chip that controls the light driving of each of the light emitting diodes 4, and the like. The light driving circuit 11 and the light emitting diodes 4 constitute a heat source on the backlight device 2 side.

As the light guide plate 5, a synthetic resin, for example, a transparent acrylic resin or the like is used. Moreover, as is illustrated in FIG. 2, the light guide plate 5 has a rectangular-shaped cross section, in which light from the plurality of the respective light emitting diodes 4 that are disposed respectively in the upper region and the lower region is incident on an upper side lateral surface and a lower side lateral surface. Then, in the light guide plate 5, the illumination light is output from a light emitting surface that is disposed opposite to the diffusing sheet 8 toward the liquid crystal panel 3.

More specifically, the respective light emitting diodes 4 in the upper region and the lower region and the light guide plate 5 are stored in a case which is not illustrated, and the light from the respective light emitting diodes 4 is efficiently introduced directly or indirectly via a reflector, from the corresponding upper lateral surface or lower lateral surface into an inside of the light guide plate 5, in a state where leakage of the light toward the outside is prevented to be as minimal as possible. Thereby, the backlight device 2 can increase an efficiency of utilizing the light from the respective light emitting diodes 4 easily, thus increasing the brightness of the illumination light easily.

Moreover, as described above, the plurality of the light emitting diodes 4 include the light emitting diodes 4r, 4g, 4b that emit light in the respective colors of R, G, B, and this light guide plate 5 mixes the introduced light in respective colors of R, G, B to obtain white light, and outputs the white light as the illumination light from the light emitting surface. Thereby, the backlight device 2 can improve emission quality of the illumination light, and allow the illumination light that is appropriate for full-color imaging to be incident on the liquid crystal panel 3, thus making possible to improve the display quality of the liquid crystal panel 3 easily.

Moreover, regarding the plurality of the light emitting diodes 4, the numbers, kinds, sizes and the like of the respective light emitting diodes 4r, 4g, 4b in the colors of R, G, B to be provided are selected, according to the size of the liquid crystal panel 3 and its required displaying functions such as brightness and display quality. More specifically, as each of the light emitting diodes 4, for example, a power LED with a consumption power of about 1 W or a chip LED with a consumption power of about 70 mW is used as appropriate.

Further, the light amounts of the respective light emitting diodes 4r, 4g, 4b in the colors of R, G, B are measured in advance, and the light emitting diodes 4r, 4g, 4b are classified as any one of light amount rank of a high light amount rank and a low light amount rank according to the result of the light amount measurement. That is, light flux amounts of the respective light emitting diodes 4 are measured under the same measurement conditions such as a surrounding temperature (for example, about 25° C. (room temperature)) and a supply current value, by using an integrating photometer at the time of lighting the light emitting diodes 4. Then, in the case where the measurement value of the light flux amount of any of the light emitting diodes 4 is a predetermined threshold value or more, this light emitting diode 4 is classified as the high light amount rank. On the other hand, in the case where the measurement value is less than the threshold value, this light emitting diode 4 is classified as the low light amount rank.

More specifically, in the case where the red light emitting diode 4r has the measurement value of 35 lumens or more, it is classified as the high light amount rank. Moreover, in the case where the green light emitting diode 4g has the measurement value of 45 lumens or more, it is classified as the high light amount rank, and in the case where the blue light emitting diode 4b has the measurement value of 11 lumens or more, it is classified as the high light amount rank.

As described above, the backlight device 2 is structured so as to be able to solve the variation of the light amounts of the respective light emitting diodes 4, by classifying the light emitting diodes 4 as any one of the high light amount rank and the low light amount rank according to the results of the light flux amounts (light amounts) that are measured under the same measurement conditions. Incidentally, besides the above-described method, luminosity values (candelas) of the respective light emitting diodes 4 are measured by using a photometer, and the light amount ranks of the light emitting diodes 4 may be classified according to the measured luminosity values. That is, the light emitting diodes that are regulated with the values of candelas may be classified as any one of the plurality of the light amount ranks in advance, by using the measured luminosity values as described above.

Moreover, in the backlight device 2, the above-described upper region and lower region that are the regions to dispose the light emitting diodes 4 are set in the locations that are different from each other, by using the temperature distributions when using the liquid crystal display 1. Describing in detail, in the backlight device 2, the temperature distributions inside the above-described case during the use of the liquid crystal display 1 is obtained by measurement or simulation beforehand, it is known in advance that a temperature of the upper region which is disposed on the upper side in the vertical direction during the use of the liquid crystal display 1 is higher than a temperature of the lower region which is disposed on the lower side in the vertical direction by, for example, about 10° C. to 15° C. That is, during the use of the liquid crystal display 1, it is judged in advance that the temperature of the upper region becomes higher than that of the temperature of the lower region by about 10° C. to 15° C. as described above, due to not only the heat from the light emitting diodes 4 that are disposed inside thereof, but also influences of the heat from the light emitting diodes 4 disposed in the lower region, the driving control circuit 10 and the light driving circuit 11, thereby setting the upper region and the lower region whose temperature distributions during the use are different from each other.

Further, in the backlight device 2, the light emitting diodes 4 that are classified as the high light amount rank are disposed in the upper region. On the other hand, the light emitting diodes 4 that are classified as the low light amount rank are disposed in the lower region. That is, the light emitting diodes 4 that are classified as the high light amount rank or the low amount rank as a result of the measurement under the same conditions are disposed in the upper region at the high temperature or the lower region at the low temperature, respectively. Thereby, in the backlight device 2, the light amounts of the light emitting diodes 4 in the upper region can be substantially equal to that in the lower region during the use of the liquid crystal display 1, thereby preventing the occurrence of the brightness unevenness of the illumination light to be least possible. That is, the light emitting diode 4 generally has a lower emission efficiency as the surrounding temperature is higher, and then a light emission amount thereof is more likely to be lessened.

On the other hand, in the backlight device 2, the light emitting diodes 4 at the high light amount rank are disposed in the upper region at the high temperature, and the light emitting diodes 4 at the low light amount rank are disposed in the lower region at the low temperature, whereby, even in the case of supplying currencies of equal values to the respective light emitting diodes 4 in the upper region and lower region, negative influences caused by a decrease of the emission efficiency due to an increase of the temperature of the light emitting diodes 4 that are disposed in the upper region and a decrease of the light emission amount caused thereby can be avoided, and the light emission amounts in the upper region and the lower region can be made uniform.

In the present preferred embodiment having the structure as described above, the light amounts of the plurality of the respective light emitting diodes 4 are measured, and each of the light emitting diodes 4 is classified as the high light amount rank or the low light amount rank according to the thus obtained measurement results in advance. Moreover, in the present preferred embodiment, as the disposition region of the light emitting diodes 4, the upper region and the lower region that have the different temperature distributions during the use of the liquid crystal display 1 are set. Further, in the present preferred embodiment, in the upper region and the lower region, the light emitting diodes 4 that are classified as the high light amount rank and the low light amount rank are disposed, respectively. Thereby, in the respective disposition regions of the upper region and the lower region, even when the using environment such as the surrounding temperature is changed, the occurrence of the brightness unevenness caused by the variation of the light amounts of the respective light emitting diodes 4 can be prevented.

Accordingly, in the present preferred embodiment, even in the case of increasing the number of the light emitting diodes 4 to be disposed, the occurrence of the overall brightness unevenness can be prevented in the illumination light that is output from the backlight device 2 toward the outside, which is distinct from the conventional example. Moreover, even when increasing the number of the light emitting diodes 4 to be disposed, the backlight device 2 that prevents the occurrence of the brightness unevenness, whereby the present preferred embodiment makes possible to structure the liquid crystal display 1 with the excellent display function easily, even when increasing the brightness and the screen size of the liquid crystal panel (display portion) 3.

Preferred Embodiment 2

Figure 3:
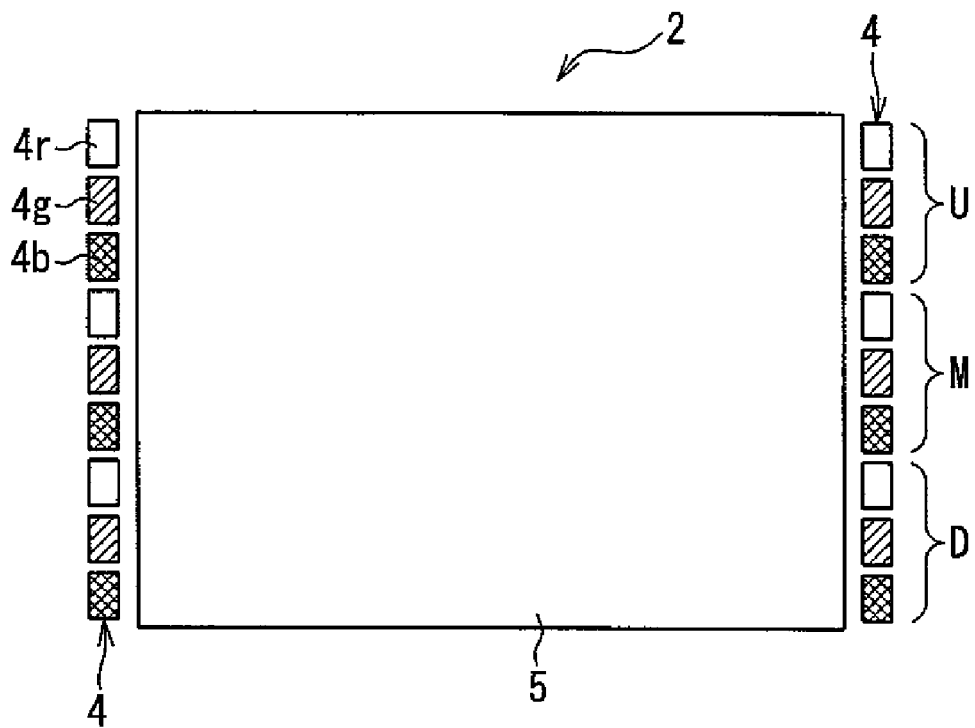
FIG. 3 is a plan view showing a structure of a relevant portion of a backlight device according to Preferred Embodiment 2 of the present invention.

FIG. 3 is a plan view showing a structure of a relevant portion of a backlight device according to Preferred Embodiment 2 of the present invention. In the figure, a main distinctive point of the present preferred embodiment from Preferred Embodiment 1 described above is setting three regions of an upper region, a middle region and a lower region as the disposition regions of the light emitting diodes, instead of the above-described upper region and lower region, and disposing the light emitting diodes that are classified in advance as a high light amount rank, a middle light amount rank and a low light amount rank respectively in the upper region, the middle region and the lower region. Incidentally, the elements that are common with those in Preferred Embodiment 1 described above are denoted by the same codes, and the overlapping explanation will be omitted.

That is, as illustrated in FIG. 3, in the present preferred embodiment, three regions of an upper region U, a middle region M and a lower region D are set as the disposition regions of the light emitting diodes 4 in respective side portions on a left side and a right side of the light guide plate 5. These three regions are determined by using the temperature distributions during the use of the liquid crystal display 1 including a temperature increase of the driving control circuit 10, and are set in different locations, similarly to Preferred Embodiment 1. That is, the upper region U, the middle region M and the lower region D are the regions that are disposed from an upper side to a lower side along the vertical direction (in the acting direction of the gravity), and it is recognized, in advance, that temperatures in the upper region U, the middle region M and the lower region D are higher in this order, which is the temperature distribution during the use of the liquid crystal display 1. That is, it is judged, in advance, that the temperature in the upper region U becomes the highest due to the heat from the light emitting diodes 4 included in the disposition region on the lower side, the temperature in the middle region M is the second highest, and the temperature in the lower region D is the lowest during the use of the liquid crystal display 1, thus setting as the disposition regions of the light emitting diodes 4 with different temperature distributions. Incidentally, specific overall temperature difference between the upper region U, the middle region M and the lower region D is about 10° C. to about 15° C., for example.

Moreover, in the present preferred embodiment, the plurality of the light emitting diodes 4 are classified as any one of the three light amount ranks of the high light amount rank, the middle light amount rank and the low light amount rank in advance, according to the results of the light amounts that are measured beforehand. More specifically, for example, about 35 lumens and about 31.5 (=35×0.9) lumens are used respectively as first and second threshold values of the red light emitting diode 4r. And, the light emitting diode 4r with the measurement value of about 35 lumens or more is classified as the high light amount rank, for example. Moreover, the light emitting diode 4r with the measurement value of about 31.5 lumens or more and less than about 35 lumens is classified as the middle light amount rank, and that with the measurement value of less than about 31.5 lumens is classified as the low light amount rank, for example.

Moreover, in the present preferred embodiment, the light emitting diodes 4 at the high light amount rank, the middle light amount rank and the low light amount rank are disposed in the upper region U, the middle region M and the lower region D, respectively. That is, as illustrated in FIG. 3, the respective light emitting diodes 4r, 4g, 4b that are classified as the high light amount rank among the light emitting diodes 4r, 4g, 4b in the colors of R, G, B are disposed in the upper region U of the respective side portions on the left side and the right side. Moreover, the respective light emitting diodes 4r, 4g, 4b that are classified as the middle light amount rank are disposed in the middle region M of the respective side portions on the left side and the right side, and the respective light emitting diodes 4r, 4g, 4b that are classified as the low light amount rank are disposed in the lower region D of the respective side portions on the left side and the right side.

In the present preferred embodiment having the structure as described above, the upper region U, the middle region M and the lower region D whose temperature distributions are different from one another during the use of the liquid crystal display 1 are set as the disposition regions of the light emitting diodes 4. Moreover, the plurality of the light emitting diodes 4 are classified as any one of light amount rank of the high light amount rank, the middle light amount rank and the low light amount rank in advance, and the light emitting diodes 4 at the high light amount rank, the middle light amount rank and the low light amount rank are disposed in the upper region U, the middle region M and the lower region D, respectively. Thereby, in the present preferred embodiment, the backlight device 2 that can prevent the occurrence of the overall brightness unevenness of the illumination light can be structured similarly to that of Preferred Embodiment 1, even when increasing the number of the light emitting diodes 4 to be disposed, and the liquid crystal display 1 that exhibits an excellent displaying function can be structured easily, even when increasing the brightness and the screens size of the liquid crystal panel (display portion) 3.

Preferred Embodiment 3

Figure 4:
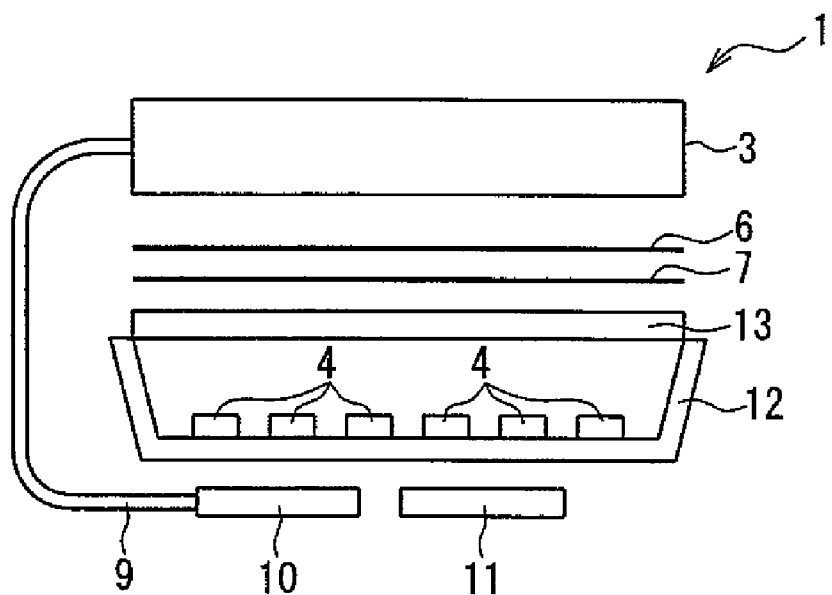
FIG. 4 is a view for explaining a backlight device and a liquid crystal display according to Preferred Embodiment 3 of the present invention.
Figure 5:
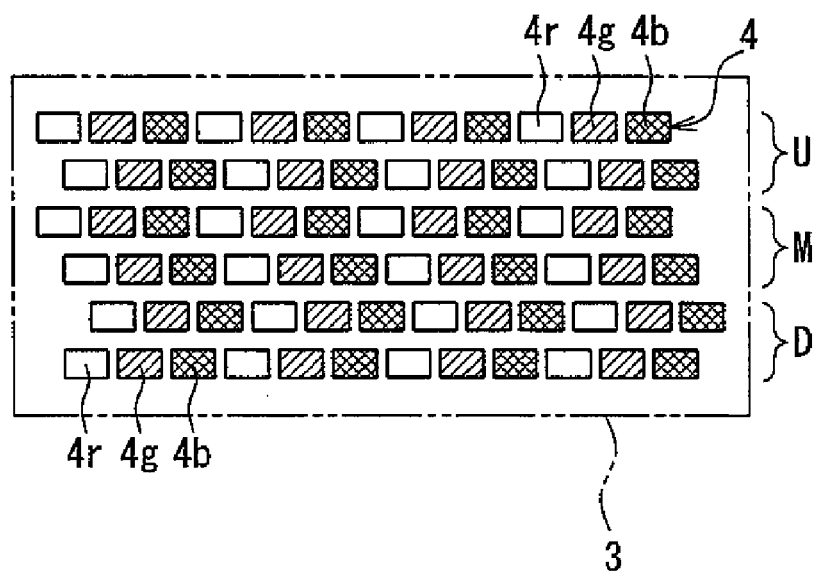
FIG. 5 is a plan view showing an example of an arrangement of light emitting diodes in the backlight device shown in FIG. 4.

FIG. 4 is a view for explaining a backlight device and a liquid crystal display according to Preferred Embodiment 3 of the present invention, and FIG. 5 is a plan view showing an example of an arrangement of light emitting diodes in the backlight device shown in FIG. 4. In the figures, a main distinctive point of the present preferred embodiment from Preferred Embodiment 2 described above is structuring a direct light type backlight device in which a plurality of the light emitting diodes are disposed on a lower side of the liquid crystal panel. Incidentally, the elements that are common with those in Preferred Embodiment 2 described above are denoted by the same codes, and the overlapping explanation will be omitted.

As illustrated in FIG. 4, in the present preferred embodiment, the plurality of the light emitting diodes 4 are stored inside a case 12 with a bottom whose upper end portion side is opened. Moreover, on the opening portion side of the case 12, a diffusing plate 13, instead of the diffusing sheet 8, is disposed so as to close the opening portion.

Moreover, as shown in FIG. 5, in the present preferred embodiment, as the disposition regions of the light emitting diodes 4, three regions of the upper region U, the middle region M and the lower region D are set. These regions in the three locations are determined by using the temperature distributions including an increase of the temperature of the driving control circuit 10 during the use of the liquid crystal display 1 similarly to Preferred Embodiment 2, and are set in the locations different from one another. That is, these upper region U, middle region M and lower region D are set based on an internal temperature distribution of the case 12 during the use of the liquid crystal display 1, and are opposed respectively to the upper portion, the middle portion and the lower portion in the vertical direction of the liquid crystal panel 3.

Moreover, in the present preferred embodiment, the plurality of the light emitting diodes 4 are classified, in advance, as any one of three light amount ranks of the high light amount rank, the middle light amount rank and the low light amount rank according to the results of the light amounts that are measured beforehand, similarly to Preferred Embodiment 2. Then, as illustrated in FIG. 5, in the present preferred embodiment, the respective light emitting diodes 4r, 4g and 4b that are classified as the high light amount rank are disposed in the upper region U at the highest temperature, similarly to Preferred Embodiment 2. Moreover, the respective light emitting diodes 4r, 4g, 4b that are classified as the middle light amount rank are disposed in the middle region M at the temperature lower than the upper region U. Further, the respective light emitting diodes 4r, 4g, 4b that are classified as the low light amount rank are disposed in the lower region D at the lowest temperature.

According to the above-described structure, in the present preferred embodiment, the backlight device 2 that can prevent the occurrence of the overall brightness unevenness of the illumination light can be structured, even in the case of increasing the number of the light emitting diodes 4 to be disposed, similarly to Preferred Embodiment 2. Further, even when increasing the brightness and the screen size of the liquid crystal panel (display portion) 3, the liquid crystal display 1 with the excellent displaying function can be structured easily.

It should be noted that the above-described preferred embodiments are all illustrative and not limiting. The technical scope of the present invention is defined by the claims, and all changes within the range equivalent to the configurations recited therein also are included in the technical scope of the present invention.

For example, the case of applying any of the preferred embodiments of the present invention to the transmission type liquid crystal display was described in the above explanation, but the backlight device of the present invention is not limited to this, and can be applied to various types of display devices that are provided with non-light-emission type display portions for displaying information such as images and characters by utilizing light from light sources. More specifically, the backlight device according to any of the preferred embodiments of the present invention can be used preferably for semi-transmission type and reflection type liquid crystal displays or a projection type display device such as a rear-projection type.

Moreover, alternatively to the above description, preferred embodiments of the present invention can be used preferably as backlight devices for X film illuminators for irradiating light to X-ray photographs, light boxes for irradiating light to negative films of photographs so as to obtain better visual recognition, and light emitting devices for lighting sign boards, advertisement boards and the like that are disposed on wall surfaces in the stations or the like.

Moreover, in the above explanation, the case of applying any of the preferred embodiments of the present invention to the liquid crystal display to be disposed such that its display surface is parallel with the vertical direction was described, but preferred embodiments of the present invention may also be applied to a liquid crystal display provided with a display surface that can be inclined at a predetermined angle with respect to the vertical direction.

Moreover, in the above explanation, the case of setting the plurality of the disposition regions of the light emitting diodes by using the temperature distributions during the use of the liquid crystal display was described, but the present invention is not limited at all, as long as each of the light amounts of the plurality of the light emitting diodes is measured in advance so as to be classified as any one of the two or more light amount ranks according to the measurement results, and each of the light emitting diodes is disposed in any one of the plurality of the disposition regions that are set in the different locations, such that the light emitting diodes that are classified as the same light amount rank are disposed in the same disposition region.

Incidentally, the case of setting the plurality of the disposition regions in the different locations by using the temperature distributions when the light emitting diodes are driven to be lighted by the light driving circuit (driving circuit), as described in the above-described preferred embodiments, is more preferable. That is, in the case of structuring as described above, the light emitting diodes at the appropriate light amount rank are disposed in the state that the temperature distributions in the respective disposition regions are recognized. The reason for this is because, the occurrence of the brightness unevenness in the respective disposition regions can be easily prevented thereby, and the occurrence of the overall brightness unevenness of the light (illumination light) to be output toward the outside can be prevented reliably, even in the case where the temperature distributions of the respective disposition regions are different.

Further, it is more preferable to set the plurality of the disposition regions in the different locations by using the temperature distributions including the temperature increase due to the heat generated by the driving control circuit (external apparatus) of the liquid crystal panel, as the above-described preferred embodiments. The reason for this is because, in this case, negative influences of change of the surrounding temperature resulted from the heat generated from the external apparatus can be avoided reliably, and the occurrence of the brightness unevenness in the respective disposition regions can be prevented more easily, thereby preventing the occurrence of the overall brightness unevenness of the illumination light more reliably. In other words, it is preferable because the plurality of the disposition regions are set in the different locations by using the temperature distributions including the temperature increase that is caused not only by the heat source (internal factor) such as the light emitting diodes included inherently in the backlight device itself, but also by the heat source (disturbance) on the side of the liquid crystal panel in which the backlight device is incorporated, thereby avoiding the negative influence of the disturbance more reliably.

Moreover, in the above explanation, the case of exemplifying the driving control circuit of the liquid crystal panel as the external apparatus of the backlight device was described, but the external apparatus of the present invention is not limited to this, and the external apparatus includes various types of electrical components, electric circuits and the like that are attached appropriately to the backlight device, and generate heat during their use so as to constitute a heat source. More specifically, considering the temperature increase due to heat of a driver IC that is mounted on one of a pair of substrates included in the liquid crystal panel, a plurality of the disposition regions can also be set.

Moreover, in the above explanation, the case of using the red, green and blue light emitting diodes that emit the colored light in the colors corresponding to R, G and B was described, but the present invention is not limited to this, and may be applied to a backlight device that includes only white light emitting diodes that emit white light as the light source and adopt a structure to classify a plurality of the respective white light emitting diodes as either of two or more light amount ranks in advance. Also, the present invention can be applied to a backlight device using light emitting diodes that respectively emit light in different colors, which are at least two colors that can be mixed with the white light, for example, yellow and blue.

Incidentally, it is preferable to use the red, green and blue light emitting diodes as described in the above-described preferred embodiments because color purities of the respective emission colors of red, green and blue that are included in the illumination light can be improved, emission quality of the backlight device can be improved easily, and the display device with higher display quality (displaying function) can be structured easily.

Moreover, Preferred Embodiments 2 and 3 described above have provided the explanation of the case where the temperatures of the upper region U, the middle region M and the lower region D are higher in this order during the use of the liquid crystal display 1, but the present invention is not limited to this. For example, in the case where heat release in the middle region M is lower than that in the upper region U or the like, the temperatures of the middle region M, the upper region U and the lower region D may be higher in this order. In such a case, the light emitting diodes that are classified as the high light amount rank may be disposed in the middle region M at the highest temperature, the light emitting diodes that are classified as the middle light amount rank may be disposed in the upper region U at the temperature lower than that of the middle region M, and the light emitting diodes that are classified as the low light amount rank may be disposed in the lower region D at the lowest temperature.

Moreover, the above explanation has provided the explanation of the case of classifying the light emitting diodes in the respective colors of R, G and B as any one of the plurality of the light amount ranks, but the present invention is not limited to this, and may adopt a structure to classify at least the red light emitting diodes into the light amount ranks among the red and green light emitting diodes whose emission effects and light amounts are likely to be changed comparatively according to the surrounding temperature.

Figure 6:
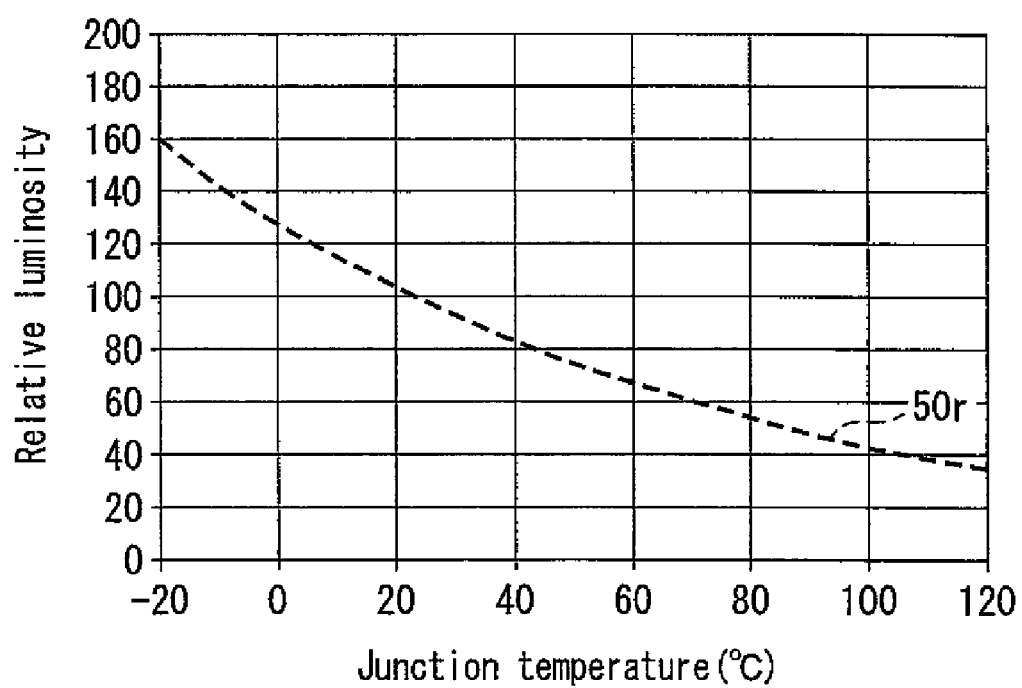
FIG. 6 is a graph showing a specific example of a temperature characteristic of a red light emitting diode.
Figure 7:
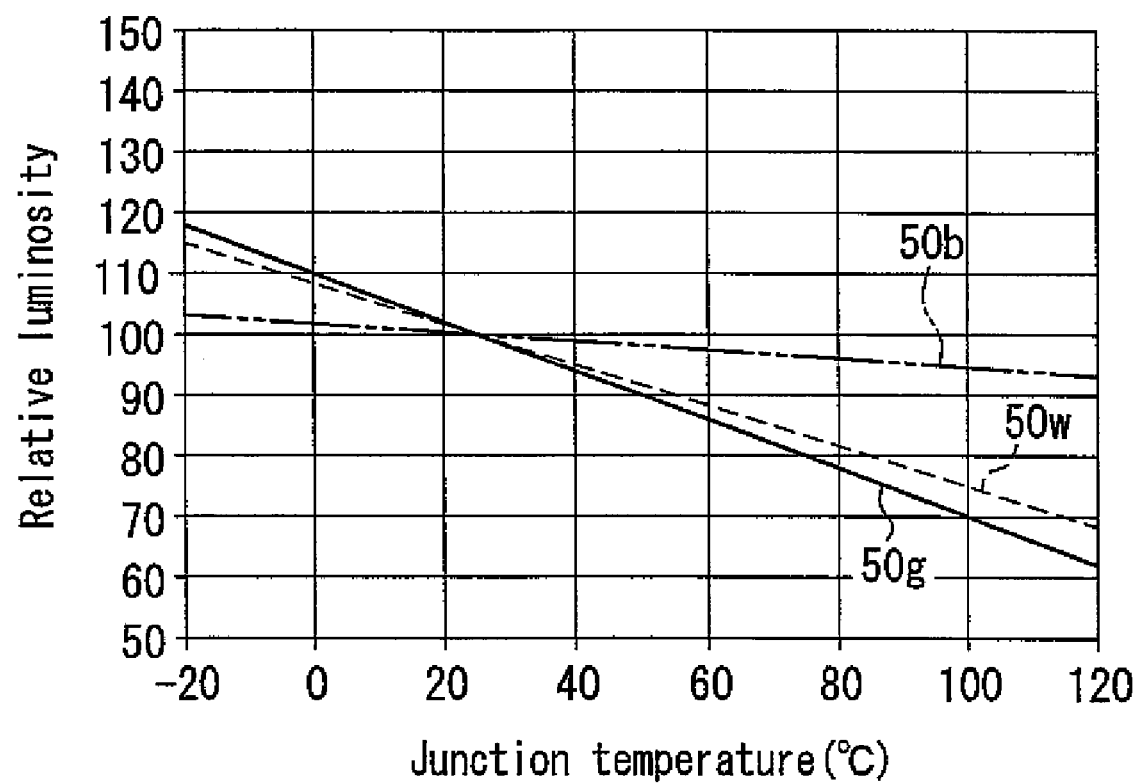
FIG. 7 is a graph showing a specific example of each of temperature characteristics of green, blue and white light emitting diodes.

That is, as illustrated in FIG. 6, in the red light emitting diode, the emission efficiency is decreased more significantly as the surrounding temperature is increased as shown by the curve 50$r$, and a relative luminosity (light amount) is also decreased significantly. Moreover, as illustrated in FIG. 7, in the green light emitting diode, the emission efficiency is decreased more as the surrounding temperature is increased as shown by the curve 50$g$, and a relative luminosity (light amount) is also decreased. Incidentally, the relative luminosity of the green light emitting diode is decreased at lower rate than that of the red light emitting diode. Moreover, in the blue light emitting diode, changes of the emission efficiency and the relative luminosity are relatively small even when the surrounding temperature is changed, as shown by the curve 50$b$.

Therefore, depending on the backlight device, a surrounding environment (allowable operating temperature range) of the liquid crystal display and the number of the light emitting diodes in the respective colors to be disposed, it is possible to classify the respective red and green light emitting diodes, whose emission efficiencies and light amounts are likely to be changed, into the light amount ranks, or classify only the red light emitting diodes, whose emission efficiencies and light amounts are most likely to be changed, into the light amount ranks. In the case of structuring as described above, the classification of the blue light emitting diodes into the light amount ranks can be omitted, so that the occurrence of the brightness unevenness can be prevented reliably and easily. Incidentally, in the case of using only the white light emitting diodes, the classification thereof into the light amount ranks is preferably performed, because changes of emission efficiencies and relative luminosities of the white light emitting diodes according to the change of the surrounding temperature are relatively large, as shown by the curve 50$w$ in FIG. 7.

Moreover, alternatively to the above explanation, it is possible to adopt a structure for preventing the occurrence of the overall brightness unevenness of the illumination light of the backlight device, by providing a temperature sensor in each of the disposition regions so as to fine-tuning a current value to be supplied to the light emitting diodes in the corresponding disposition region based on the temperature detection result, and providing an optical sensor for measuring a light amount in each of the disposition regions so as to fine-tune a current value to be supplied to the light emitting diodes in the corresponding disposition region based on the light amount measurement results.

Moreover, alternatively to the above explanation, it is also possible to adopt a structure to measure light emission spectra of the light emitting diodes beforehand, classify the color purities of the light emitting diodes as any one of the plural ranks according to the measurement results in advance, and disposing the light emitting diodes into the different disposition regions. As described above, it is preferable to classify the light emitting diodes into not only the light amount ranks but also the light emitting spectral ranks so as to dispose them in the different disposition regions, because the backlight device with the excellent emission quality and the display device with the excellent display quality can be structured easily.

The backlight device according to various preferred embodiments of the present invention and the display device using the same can prevent the occurrence of the brightness unevenness even when increasing the number of the light emitting diodes to be disposed, and thus are effective for a backlight device that can irradiate light with high brightness with respect to the display portion having a large screen and a display device provided with the display portion.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight device comprising:
   a plurality of light emitting diodes; and
   a driving circuit arranged to drive the plurality of light emitting diodes so as to light the plurality of light emitting diodes; wherein
   each of light amounts of the plurality of the light emitting diodes is measured in advance, each of the plurality of the light emitting diodes is classified as any one of two or more light amount ranks according to the measurement results, and each of the light emitting diodes is disposed in any one of a plurality of disposition regions that are set in different locations such that the light emitting diodes which are classified as the same light amount rank are disposed in the same disposition region; and
   the plurality of the disposition regions are set in the different locations by using temperature distributions that are obtained when the plurality of light emitting diodes are driven to be lighted by the driving circuit.

2. The backlight device according to claim 1, wherein the plurality of the disposition regions are set in the different locations by using the temperature distributions including a temperature increase due to heat generated by an external apparatus.

3. The backlight device according to claim 1, wherein the plurality of the light emitting diodes include plural kinds of light emitting diodes that are different in emission color.

4. The backlight device according to claim 1, wherein the plurality of the light emitting diodes include red, green and blue light emitting diodes that emit red light, green light and blue light, respectively.

5. The backlight device according to claim 3, wherein, among the plurality of the light emitting diodes, light amounts of red and green light emitting diodes that emit red light and green light, respectively, are measured in advance, and the respective red and green light emitting diodes are classified as any one of two or more light amount ranks according to the measurement results.

6. The backlight device according to claim 4, wherein, among the plurality of the light emitting diodes, light amounts of red and green light emitting diodes that emit red light and green light, respectively, are measured in advance, and the respective red and green light emitting diodes are classified as any one of two or more light amount ranks according to the measurement results.

7. The backlight device according to claim 3, wherein, among the plurality of the light emitting diodes, light amounts of red light emitting diodes that emit red light are measured in advance, and the red light emitting diodes are classified as any one of two or more light amount ranks according to the measurement results.

8. The backlight device according to claim 4, wherein, among the plurality of the light emitting diodes, light amounts of red light emitting diodes that emit red light are measured in advance, and the red light emitting diodes are classified as any one of two or more light amount ranks according to the measurement results.

9. A display device comprising:
a display portion; and
the backlight device according to claim 1; wherein
the display portion is irradiated with light from the backlight device.

* * * * *